Oct. 17, 1944.　　　　L. S. KASSEL　　　　2,360,349
CATALYTIC CONVERSION OF HYDROCARBONS
Filed April 29, 1940
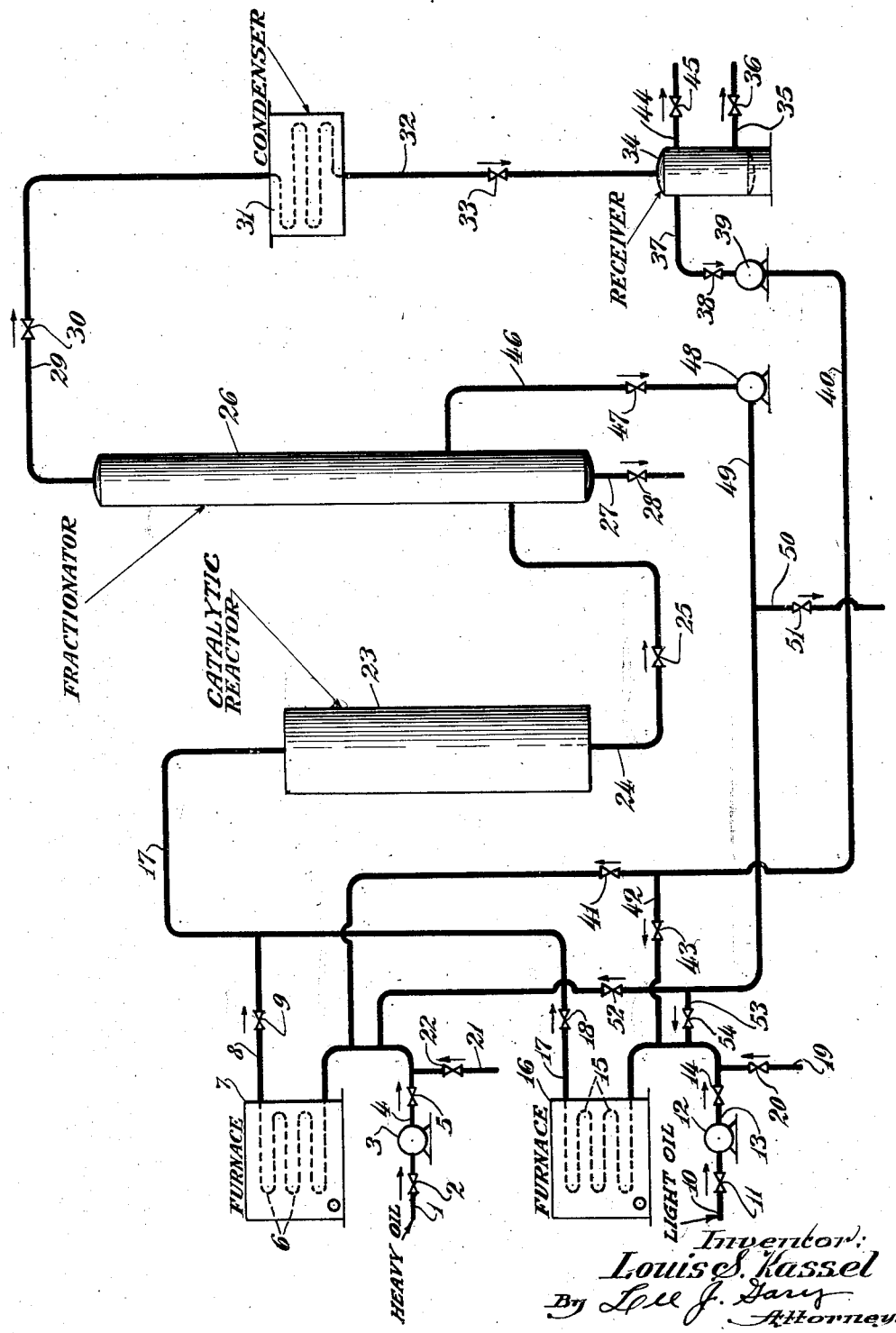
Inventor:
Louis S. Kassel
By Lee J. Gary
Attorney.

Patented Oct. 17, 1944

2,360,349

UNITED STATES PATENT OFFICE 2,360,349

CATALYTIC CONVERSION OF HYDRO-
CARBONS

Louis S. Kassel, Chicago, Ill., assignor to Universal
Oil Products Company, Chicago, Ill., a corporation of Delaware Application April 29, 1940, Serial No. 332,226

3 Claims. (Cl. 196—50)

This invention relates to a process for the catalytic conversion of hydrocarbons and more specifically it is concerned with a method wherein two streams of hydrocarbon reactants are separately heated, the more refractory stream to a relatively high temperature and the less refractory stream to a relatively low temperature, the two streams thereafter commingled to obtain the desired conversion temperature and the mixture supplied to a reaction zone containing the desired catalytic material.

In catalytic endothermic processes such as, for example, catalytic cracking, aromatization, and dehydrogenation wherein it is general practice to heat the hydrocarbon reactants to the desired conversion temperature before passing them in contact with the catalytic material, as one would expect, thermal cracking of the hydrocarbon reactants frequently occurs in the heating coil before any catalytic conversion is effected. One object of my invention, therefore, is to avoid thermal cracking of the hydrocarbon reactants which usually results in a decrease in octane rating of the gasoline produced in catalytic cracking, for example, and which may, in some cases, increase the amount of carbonaceous substances deposited on the catalytic material during the conversion treatment.

In view of the above, my invention provides for separately heating the refractory hydrocarbon reactants to a relatively high temperature, preferably above a desired conversion temperature, for the less refractory charge, thereafter commingling the heated refractory hydrocarbon reactants with the less refractory hydrocarbon charge heated to a temperature preferably below that at which pyrolytic conversion is effected, and supplying the resultant commingled reactants to the catalytic conversion zone.

In one operation of the process the refractory reactants may comprise, for example, a relatively light fraction such as gasoline, naphtha, or kerosene separated from a crude oil while the less refractory reactants may comprise a gas oil fraction, for example. In another method of operation the hotter or refractory stream may comprise, for example, intermediate conversion products formed in the process while the cooler or less refractory stream may comprise fresh charging oil. In still another method the cooler stream may comprise both the fresh feed and intermediate conversion products, while the hotter stream may consist of gaseous products formed in the process. Hot combustion gasses or steam may also be used as the hot stream and, when desired, steam or gases formed in the process may be commingled with either the hot or cold stream to promote vaporization thereof.

In one specific embodiment the invention comprises heating a charging oil to a temperature below that at which pyrolytic cracking is effected, simultaneously therewith heating intermediate conversion products formed in the process to a temperature above the temperature of said pyrolytic cracking, commingling the separately heated streams and passing the resulting mixture in contact with a bed of catalytic material for effecting conversion thereof, fractionating the conversion products to separate fractionated vapors from the higher boiling conversion products, recovering the former, and subjecting the lighter portion of said higher boiling conversion products to treatment as hereinbefore set forth as said intermediate conversion products.

Various methods for accomplishing the objects of the invention are described in detail in the following description which is to be read in conjunction with the attached diagrammatic drawing. The drawing illustrates in conventional side elevation one specific form of the apparatus which may be used to accomplish the objects of the invention. The invention is applicable to most catalytic endothermic processes such as, for example, catalytic cracking, aromatization, and dehydrogenation, however, to avoid generalities, a catalytic cracking process will be described.

Referring now to the drawing, the hydrocarbon reactants to be converted, in accordance with the objects of the invention, consists of a mixture of two streams of separately heated materials, the more refractory of which is heated to a higher temperature than the less refractory stream so that upon mixing the two streams the desired conversion temperature is obtained. The less refractory stream of materials may include a wide range of hydrocarbons depending upon the type of operation and the nature of the more refractory stream of material employed. For example, in one manner of operation, the less refractory stream may comprise a hydrocarbon oil amenable to catalytic cracking, such as gas oil, while the more refractory stream may comprise a relatively low boiling oil, such as kerosene, naphtha, or gasoline. In this case, the less refractory oil is introduced through line 1 and valve 2 to pump 3 which discharges through line 4 and valve 5 into heating coil 6. The oil in passing through heating coil 6 is heated to a temperature preferably below that at which pyrolytic cracking is effected but at the same time at a temperature sufficient to effect substantial vaporization thereof, heat being supplied by means of furnace 7. The heated reactants leaving heating coil 6 are directed through line 8 and valve 9 into line 17 for treatment in the manner to be described later.

Simultaneously with the treatment of the less refractory stream of hydrocarbon oil in coil 6, the more refractory stream is introduced through line 10 and valve 11 to pump 12 which discharges through line 13 and valve 14 into heating coil 15. The stream of hydrocarbons supplied to coil 15 is preferably heated therein to a temperature above the desired conversion temperature so that upon mixing this stream with the stream of hydrocarbons heated as above mentioned the desired conversion temperature is obtained. Heat is supplied to the hydrocarbons in coil 15 by means of furnace 16. The heated more refractory stream of hydrocarbons from coil 15 is directed through line 17 and valve 18 and commingled with the less refractory stream supplied to this line as previously described, and the mixture thereafter subjected to treatment in the manner to be described later.

In another manner of operation, all of the fresh feed comprising, for example, a hydrocarbon oil susceptible to catalytic cracking is supplied to heating coil 6 by way of line 1, valve 2, pump 3, line 4, and valve 5 and the heated reactants from coil 6 introduced to line 17 by way of line 8 and valve 9. Simultaneously therewith, intermediate conversion products formed in the process and supplied to line 13 in the manner to be described later are introduced to coil 15 and the resulting intermediate conversion products commingled with the heated reactants from coil 6 in line 17. In this operation, instead of employing intermediate conversion products as the more refractory stream, steam or combustion gases introduced by way of line 19 and valve 20 may be supplied to coil 15 by way of line 13 and heated therein to a relatively high temperature and thereafter commingled with the stream of reactants from coil 6 and, when desired, the intermediate conversion products formed in the process may be recovered as a product of the process or commingled with the stream of hydrocarbon reactants supplied to coil 6 in the manner to be described later.

Normally gaseous products formed in the process may also be employed as the more refractory stream of materials and these gases supplied to heating coil 15 in the manner to be described later may be commingled with the heated reactants from coil 6 in line 17. When desired, a portion of the normally gaseous products may be commingled with the less refractory stream of hydrocarbons in the manner to be described later and the mixture supplied to heating coil 6, the introduction of such gases serving to assist in the vaporization of the hydrocarbons in coil 6. Steam may also be employed to assist in the vaporization of hydrocarbons in coil 6 and may be introduced by way of line 21 and valve 22.

In accordance with the objects of the invention, the less refractory stream of hydrocarbon reactants supplied to coil 6 is preferably heated to a temperature ranging, for example, from 700 to 900° F., whereas the more refractory stream of materials supplied to coil 15 may be heated to a temperature ranging, for example, from 800 to 1200° F., depending upon the nature of the material supplied to this coil. Combustion products, for example, may be heated to a temperature considerably higher than the temperature to which the normally gaseous products, intermediate conversion products, or the more refractory stream of fresh charging oil may be heated. In any case, the mixture of hydrocarbon reactants in line 17 at a temperature ranging, for example, from 750 to 1050° F. is supplied to reactor 23.

Reactor 23, in the case here illustrated, may comprise, for example, a reactor of the type which contains a plurality of elongated tubular elements containing the catalytic material wherein provisions are made for supplying heat to the reaction zone during the conversion cycle and cooling while the catalytic material is undergoing reactivation, the heating or cooling medium supplied from an exterior source and passed in contact with the exterior of the reaction zone. Preferably, however, since reactors of the type above mentioned are extremely uneconomical, a reactor of the adiabatic type is utilized. Reactors of the adiabatic type may comprise, for example, those which contain one or a plurality of beds of catalytic material through which the hydrocarbon reactants are passed and wherein no external heating or cooling means are necessary. It is to be understood, however, that the invention is not limited to a process employing any specific type of reactor but may employ reactors of the type well known in the art.

Since in the majority of catalytic endothermic reactions carbonaceous substances are deposited on the catalytic material during the endothermic conversion cycle, suitable provisions are made for periodically subjecting said catalytic material to reactivation. Reactivation may be accomplished in a variety of ways, the more common of which involves passing a stream of relatively inert gases, such as combustion gases containing controlled minor amounts of oxygen in contact with the bed of catalytic material, thereby removing the carbonaceous substances by combustion. Preferably also, since frequent reactivations are necessary more than one reactor is employed, although only one is shown in the accompanying drawing, in order that conversion treatment may be carried on continuously.

Catalysts which have been found to be effective in the catalytic cracking of hydrocarbon vapors may comprise pellets or granules of silica or other siliceous and refractory materials composited with compounds selected from the group consisting of alumina, zirconia, vanadia, and thoria. In addition, the hydrosilicates of alumina, acid treated clays, or the like, have also been found to be effective in the cracking treatment of hydrocarbon vapors. Although the catalysts above recited are generally considered to be the preferred catalysts their use is not to be construed as a limiting feature, for various other catalysts well known to those in the art may be employed within the broad scope of the invention.

The conversion products leaving reactor 23 are directed through line 24 and valve 25 into fractionator 26 wherein fractionation into fractionated vapors and higher boiling conversion products is accomplished. Preferably also, since in catalytic cracking heavy conversion products are formed which are not susceptible to further conversion, the heavy conversion products separated from the fractionated vapors in fractionator 26 are further separated into a residue fraction and intermediate conversion products. The residue or high boiling conversion products are removed from fractionator 26 by way of line 27 and valve 28 and recovered as a product of the process or subjected to any desired further treatment. Fractionated vapors are removed from fractionator 26 by way of line 29 and are directed through valve 30 to cooling and condensation in condenser 31. Distillate, together with undissolved and uncondensed gases in condenser 31, is directed through line 32 and valve 33 into receiver 34 wherein the distillate and gases are collected and separated. A portion of the distillate separated in receiver 34 may be returned to the upper portion of fractionator 26 by well known means, not shown, to serve as a refluxing and cooling medium while the remaining portion thereof is removed from receiver 34 by way of line 35 and valve 36 and recovered as a product of the process or subjected to any desired further treatment.

When desired, a portion of the normally gaseous products collected and separated in receiver 34 may be removed therefrom by way of line 37 and directed through valve 38 to compressor 39 which discharges through line 40 and all or a portion of the gases in line 40 may be directed through valve 41 into line 4, commingling therein with the hydrocarbon reactants supplied to coil 6 for the reasons previously described. On the other hand, all or a portion of the normally gaseous products in line 40 may be directed through line 42 and valve 43 into line 13 by means of which they are supplied to coil 15 for use as previously described. The remaining portion of the normally gaseous products collected and separated in receiver 34 are removed therefrom by way of line 44 and valve 45 and recovered as a product of the process or subjected to any desired further treatment.

Light intermediate conversion products collected and separated in fractionator 26 are removed therefrom by way of line 46 and directed through valve 47 to pump 48. Pump 48 discharges through line 49 and all of the intermediate conversion products may be recovered as a product of the process by directing them through line 50 and valve 51. Preferably, however, the light intermediate conversion products in line 49 are returned to the reaction zone for further treatment, and this may be accomplished by directing them through valve 52 into line 4 for treatment as previously described, or they may be directed through line 53 and valve 54 into line 13, in the former case to be heated with the fresh feed and in the latter case to be used principally as a heat carrying medium for all of the hydrocarbon reactants subjected to treatment in reactor 23.

An example of one specific operation of the process as it may be accomplished in an apparatus such as illustrated and above described, is approximately as follows: Fresh feed comprising a 36° A. P. I. gravity Pennsylvania gas oil is heated to a temperature of approximately 800° F. Simultaneously therewith, intermediate conversion products are heated to a temperature of approximately 1000° F. The two separately heated streams are commingled and the resulting mixture at a temperature of approximately 950° F. is passed in contact with a bed of silica-alumina catalyst at a pressure of approximately 40 pounds per square inch. The conversion products formed under substantially adiabatic conditions are fractionated to separate fractionated vapors from the higher boiling conversion products and the latter further separated into light and heavy reflux condensates. The heavy reflux condensate comprising heavy conversion products not susceptible to further catalytic conversion is recovered as a product of the process and the light reflux condensate is subjected to further treatment as said intermediate conversion products. The fractionated vapors are cooled and condensed and the resulting distillate and gas collected and separated.

The operation when employing the conditions above mentioned will yield approximately 65% of 80 octane number gasoline, approximately 15% of residue, the balance being principally gas and loss.

I claim as my invention:

1. A process for the catalytic cracking of hydrocarbon oils which comprises commingling a relatively inert gas with a hydrocarbon oil amenable to catalytic cracking, heating and vaporizing the mixture with substantially no pyrolytic cracking thereof, simultaneously therewith heating another more refractory hydrocarbon oil to a temperature above the desired conversion temperature, commingling the two separately heated streams and subjecting the mixture to contact with a mass of catalytic material for effecting conversion thereof, fractionating the conversion products to separate fractionated vapors from the higher boiling conversion products and further separating said higher boiling conversion products into intermediate conversion products and heavy conversion products and recovering the heavy conversion products, commingling the intermediate conversion products with the first-named oil prior to heating and vaporizing the latter, cooling and condensing said fractionated vapors and collecting and separating the resulting distillate and gas.

2. The process defined in claim 1 further characterized in that the inert gas commingled with the hydrocarbon oil amenable to catalytic cracking consists essentially of steam.

3. The process defined in claim 1 further characterized in that the inert gas commingled with the hydrocarbon oil amenable to catalytic cracking consists essentially of normally gaseous products formed in the process.

LOUIS S. KASSEL.